June 16, 1942.  C. H. PETERSON  2,286,760
CLUTCH
Filed Jan. 23, 1941

Inventor:
CARL H. PETERSON,
by John E. Jackson
his Attorney.

Patented June 16, 1942

2,286,760

UNITED STATES PATENT OFFICE 2,286,760

CLUTCH

Carl H. Peterson, Worcester, Mass., assignor to The American Steel and Wire Company of New Jersey, a corporation of New Jersey Application January 23, 1941, Serial No. 375,669

2 Claims. (Cl. 192—38)

This invention relates to improvements in clutches.

The objects of my invention are to provide a positive clutch which is simple, durable and efficient, and one which may be employed for frequent quick starting and stopping, as in presses, punches, shears, wire coilers and the like.

The invention further contemplates a non-slipping clutch mechanism which will have freedom from failure due to wear and the demands of the heavy sudden loads encountered in the operation and driving of machines of the character above stated.

Additional objects and advantages will become apparent from the following description taken in connection with the accompanying drawing wherein.

Figure 1:
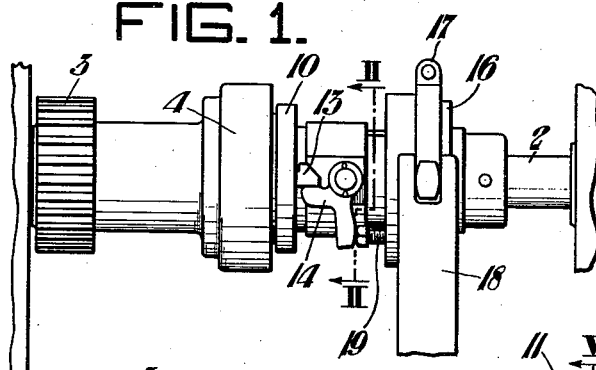
Fig. 1 is an elevational view of a clutch embodying my invention.
Figure 2:
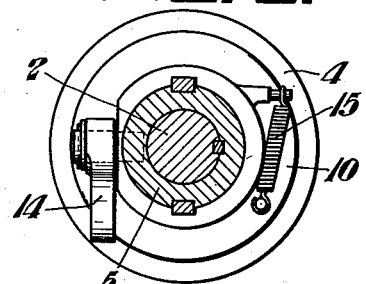
Fig. 2 is a cross-section taken on the line II—II of Fig. 1.
Figure 3:
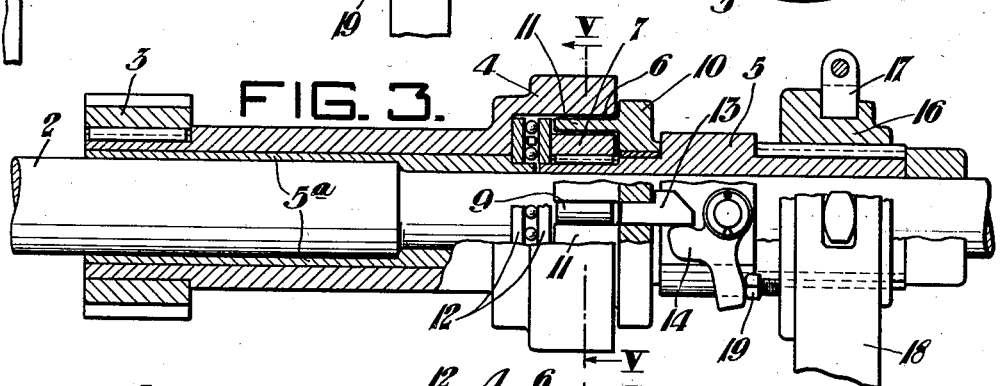
Fig. 3 is a longitudinal section of the clutch disengaged.

Referring to the drawing, 2 designates a driving shaft from which it is desired to selectively transmit power to a gear 3, as by means of a clutch.

Gear 3 may be secured to the outer member or housing 4 of the clutch of my invention as shown, said housing preferably being rotatably mounted on a bushing 5a on the shaft 2. One end of the housing 4 is enlarged and is formed with an inner annular clutch face 6 spaced outwardly and concentrically of one end of a second bushing 5 secured to the shaft 2.

7 designates a cam keyed to the bushing 5 within and spaced from the face 6, said cam having multiple reverse curved cam faces 8 each providing high and low circumferential portions for coaction with spaced rollers 9 disposed parallel to the shaft axis, the radial distance between the high cam portions and the clutch face 6 being less than the diameter of the rollers 9, and the radial distance between the low portions and said face being greater than said diameter.

A clutch release member 10 is freely rotatable on the bushing 5 on a portion of the latter outside the housing 4, and has an annular spider portion comprising spaced fingers 11 extending axially between the housing 4 and cam 7, and between the rollers 9, for actuating the latter as hereinafter set forth. A thrust bearing 12 is preferably enclosed within the housing 4 and against which the inner ends of the rollers, the cam and the housing bear.

Release member 10 is provided with an axial lug 13 projecting outwardly therefrom for actuation of said member by an engaging trigger 14 radially pivoted on the bushing 5. A spring 15 is connected between the member 10 and the bushing, and exerts a tension on the release member in a direction urging rotation thereof contra to the direction of rotation of the shaft 2.

Figure 4:
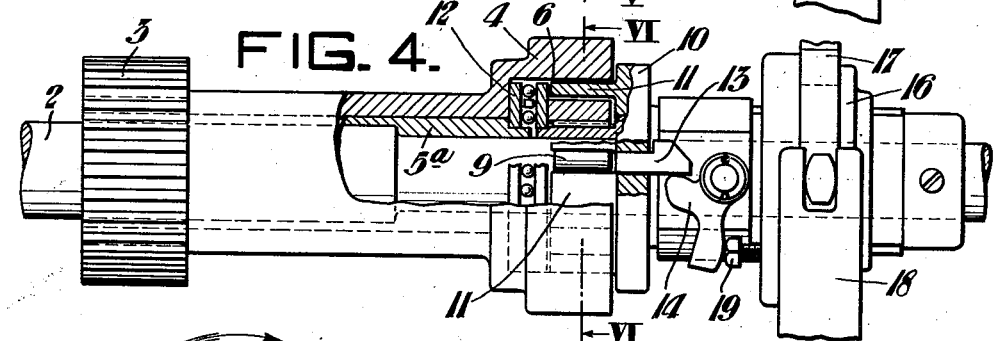
Fig. 4 is a similar view, showing the clutch engaged.

A clutch collar 16 is slidable on and rotatable with the bushing 5, said collar being grooved to receive a shifting yoke 17 having an operating lever 18 in engagement therewith. The lever 18 is mounted in any suitable manner for sliding the collar 16 on its bushing to actuate the trigger 14, said collar having a set screw 19 in alignment and engagement with the trigger to rotate the latter upon movement of the collar toward the clutch release member, as in Fig. 4, against the tension of the spring 15.

Figure 5:
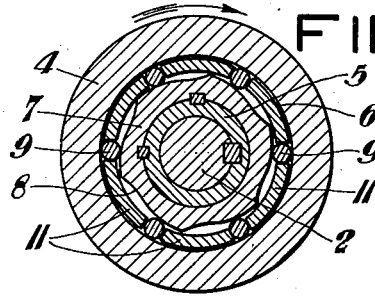
Fig. 5 is a cross-section on the line V—V of Fig. 3.
Figure 6:
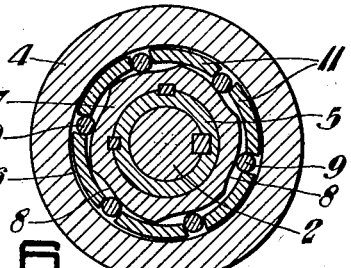
Fig. 6 is a cross-section on the line VI—VI of Fig. 4.
Figure 7:
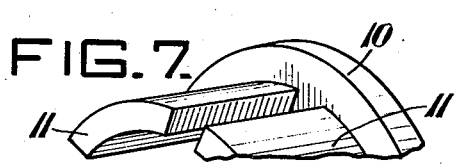
Fig. 7 is a fragmentary perspective view of the clutch release member.

In operation, the shaft 2 is driven in the direction of the arrow in Fig. 5, thereby engaging the clutch by the frictional engagement of the rollers 9 with the housing face 6, due to said rollers being forced radially outward by the high portion of the cam faces 8, thereby quickly and frictionally engaging and rotating the housing 4 and its gear 3.

When it is desired to disengage the clutch, the lever 18 is moved to slide collar 16 toward the clutch, thereby actuating trigger 14 to rotate the release member 10 in the direction of rotation of the shaft, whereby fingers 11 of said member circumferentially displace the rollers 9 from engagement with the high cam portions into the low clearance portions of the cam in disengagement from the housing face 6, said rollers being maintained out of engagement until lever 18 is again released.

Upon releasing said lever, the spring 15 quickly returns the member 10 to its original position, whereby rollers 9 are again engaged with the high cam portions to grip the housing for driving the latter.

It will be seen that I have provided a quick acting clutch capable of use for the purposes stated, and that the same is simple and highly efficient. The form of the cam faces 8 and their relation to the rollers readily compensates for wear, whereby the clutch is exceptionally durable in use.

Various changes and modifications are contemplated within the scope of the following claims.

I claim:

1. In a clutch mechanism, the combination with a driving shaft, of a clutch member freely rotatable thereon for selectively transmitting power from the shaft, said member having a concentric inner annular face spaced from the shaft, a cam secured to the shaft concentric within and spaced from the face of the clutch member, a plurality of rollers extending axially between said cam and face, the cam having roller recesses and having raised portions for radially displacing said rollers outwardly into engagement with the face upon rotation of the shaft, a spider having spaced portions extending axially between the rollers, said spider being freely rotatable on the shaft, a spring rotatable with the shaft and exerting a tension on the spider urging rotation thereof in a direction contra to that of the shaft, said spider having an actuating lug extending axially therefrom, a trigger pivoted to and rotatable with the shaft, said trigger engaging the lug when the spider is in position whereby the clutch rollers are in engagement with the face of the clutch member, and a clutch collar rotatable with the shaft and slidable thereon to actuate the trigger, thereby disengaging the clutch by rotating the spider to retract the rollers into the cam recesses out of engagement with the clutch member face.

2. In a clutch mechanism, the combination with a driving shaft, of a clutch member freely rotatable thereon for selectively transmitting power from the shaft, said member having a concentric inner annular face spaced from the shaft, an elongated sleeve secured to the shaft, a cam secured to the sleeve and being disposed concentric within and spaced from the face of said member, a plurality of rollers extending axially between said cam and face, the cam having roller recesses and having raised portions for radially displacing said rollers outwardly into engagement with the face upon rotation of the shaft, a spider freely rotatable on the sleeve and having spaced portions extending axially between the rollers, a spring secured to the sleeve and spider exerting a tension on the latter urging rotation thereof in a direction contra to that of the shaft, said spider having an axially extending actuating lug, a trigger pivotally mounted on the sleeve adjacent the spider and adapted to engage said lug, a collar rotatable with and slidable along the sleeve to engage and actuate the trigger, thereby rotating the spider to disenage the clutch.

CARL H. PETERSON.